July 24, 1951 S. B. HARRIS 2,561,509

MAGAZINE PENCIL

Filed Aug. 30, 1949 2 Sheets-Sheet 1

INVENTOR

Samuel B. Harris.

BY Herbert M. Birch

ATTORNEY

July 24, 1951 S. B. HARRIS 2,561,509

MAGAZINE PENCIL

Filed Aug. 30, 1949 2 Sheets-Sheet 2

INVENTOR
Samuel B. Harris.

BY Herbert M. Birch
ATTORNEY

Patented July 24, 1951

2,561,509

UNITED STATES PATENT OFFICE 2,561,509

MAGAZINE PENCIL

Samuel B. Harris, St. Petersburg, Fla.

Application August 30, 1949, Serial No. 113,071

7 Claims. (Cl. 120—14.3)

The present invention relates to magazine pencils and more particularly to a lead selecting and feeding arrangement for such pencils.

It is an object of this invention to provide a magazine lead pencil wherein means are provided for positive selection and feeding of any individual lead desired from the lead magazine.

Another object is to provide in combination with a rotatable lead magazine, a single lead carrier adapted to project any one of the leads selected from the lead magazine to writing position.

Another object is to provide in a lead carrier, a novel clutch head for gripping and releasing selected pieces of lead.

A further object is to provide in combination, a reciprocable lead carrier and clutch member for use with a rotatable lead magazine arranged for selecting and feeding leads one at a time from individual lead holding channels of the rotatable lead magazine, the lead magazine being operatively connected to a selector cap and being locked against rotation while the lead carrier is forward in writing position or in a channel of the lead magazine, and it being unlocked for rotation only when the lead carrier and its clutch member is completely retracted from the lead magazine and the cap thereby released to permit rotation of the lead magazine.

Still a further object is to provide means adapted to prevent reciprocation of the lead carrier when in its upper position, until the lead magazine is unlocked to permit rotation thereof into desired lead selecting positions, whereby it is practically impossible to wrongly operate the pencil.

Another object is to provide in a magazine lead pencil, novel means for automatically releasing a piece of lead from the lead carrier jaws of the device comprising a plurality of lead end engaging projections operatively associated with the head end of each lead cylinder in the magazine, said projections being so arranged, shaped and proportioned as to spread apart the lead gripping jaws of the lead clutch and carrier when it is retracted from a lead cylinder of the magazine while engaged against the upper end of a piece of lead between clutch jaws of the lead carrier.

A further object is to provide a magazine pencil with single lead carrier means and fewer parts, whereby the device is economical to manufacture, easily assembled and very durable.

The above and further objects and advantages of the present invention will more fully appear from the following detailed description thereof, in which two forms of apparatus for practicing the invention are described and illustrated with the accompanying drawings.

Figure 4:
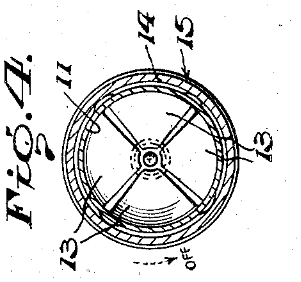
Fig. 4 is a similar view to Fig. 3, but with the fingers released from lead gripping position.
Figure 3:
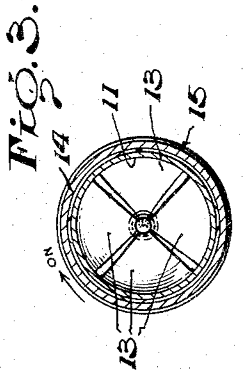
Fig. 3 is a transverse cross section view on the line 3—3 of Fig. 2 of the pencil tip and lead clutching fingers of the tip shown in lead gripping position.
Figures 5, 6, 7, 8, 9, 10, 11:
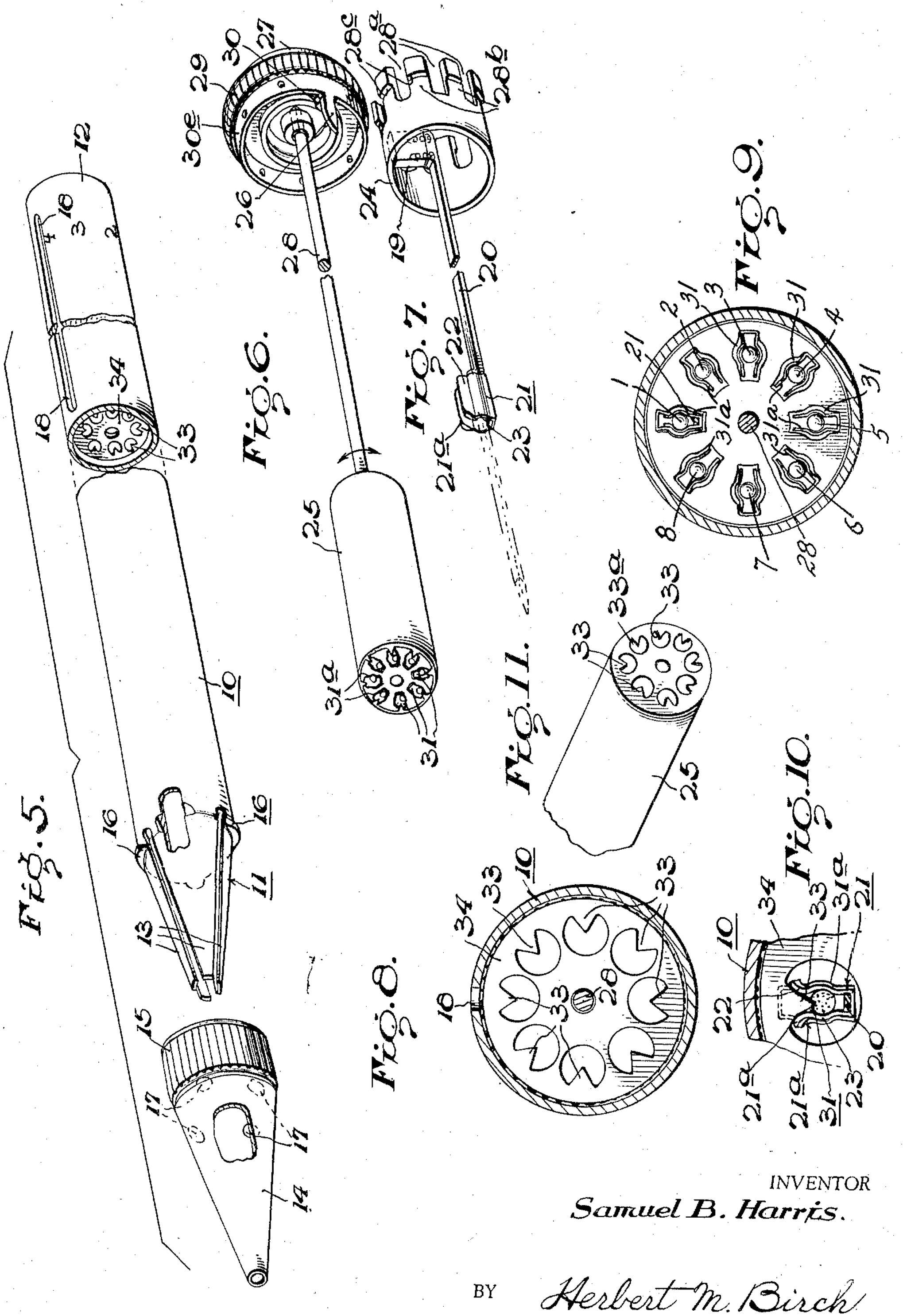
Fig. 5 is an exploded view in perspective of the pencil barrel partly in section at the lead releasing station and of the pencil tip portion and conical clutch finger actuating sleeve with the cap and lead magazine removed.
Fig. 6 is a perspective view of the said cap and lead magazine.
Fig. 7 is a perspective view of the lead carrier and its clutch showing the connection thereof to the lead index ring.
Fig. 8 is a transverse section through the pencil barrel taken on the line 8—8 of Fig. 2, to show the lead release and clutch jaw spreader or lead raking projections.
Fig. 9 is a transverse section taken on the line 9—9 of Fig. 1.
Fig. 10 is a magnified fragmentary view of one of the lead and clutch release or lead raking projections showing it in the act of spreading the clutch jaws and releasing or raking out the lead.
Fig. 11 is a slightly modified showing of the lead and clutch release arrangement showing it as an integral part of the upper end of the lead magazine.

Referring to the drawings, and first with particular reference to Fig. 5, there is shown a hollow barrel 10 having a pointed tip 11 and an open butt end 12. The tip end of the barrel is formed with a plurality of slots to thereby form a plurality of clutch fingers 13. Mounted over the tip 11 is a conical sleeve 14. This sleeve 14 is formed with an outer knurled portion 15 at its relatively larger open end around the outer periphery thereof. The base of each of the clutch fingers 13 is formed with a bead or small humps 16. These coact with the interior surfaces of indentations 17 formed in the internal bore at the base of the conical sleeve 14 to compress the free ends of the fingers 13 into gripping engagement with a piece of lead when projecting in writing position from the tip of the sleeve 14. The turning of the sleeve 14 thus serves to contract or squeeze together the clutch fingers 13 formed in the tip portion of the barrel 10 for the purpose of gripping lead which has been prjected to writing position, see Figs. 3 and 4, by the lead carrier or plunger to be hereinafter described.

Figure 1:
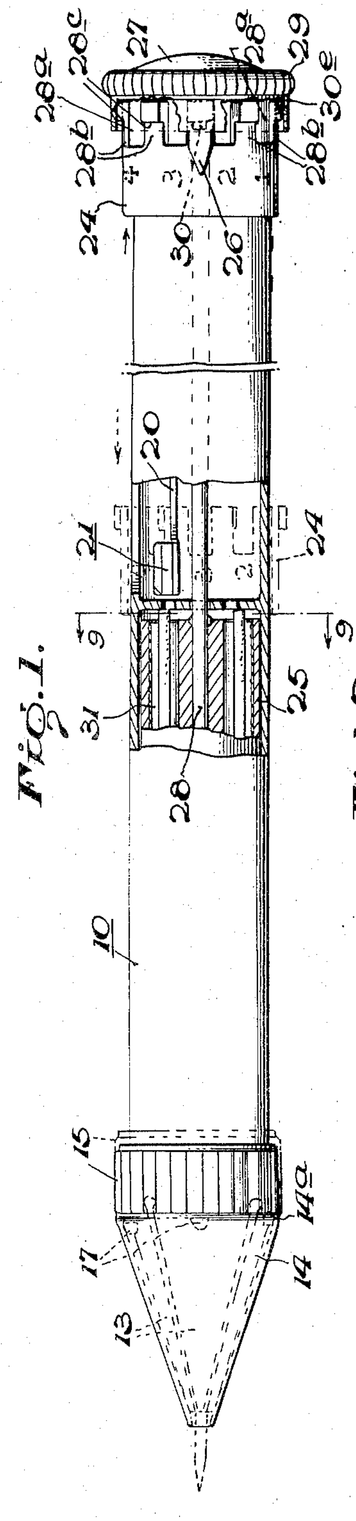
Fig. 1 is a longitudinal side view of the present invention with a partial cross section of the barrel, lead magazine and one form of the lead release clutch jaw lead raking projections for engaging the top ends of the leads.
Figure 2:
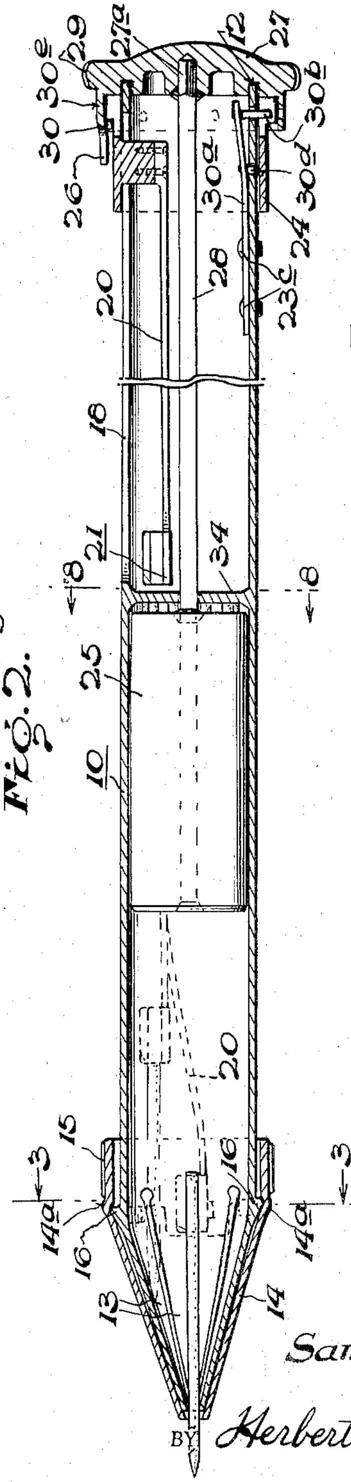
Fig. 2 is a longitudinal cross section view of the pencil barrel and tip with the lead magazine in side elevation therein.

The barrel 10, shown in Figs. 1, 2 and 5, may be made of any suitable material, such as synthetic plastic resin compounds and is preferably either transparent or translucent to add to the attractive appearance of the pencil. The transparent barrel has an additional advantage in that this facilitates location of the leads and several parts of the pencil in case of possible misuse or breakage. The open butt end 12 of the barrel is formed with an elongated longitudinally extending slot 18 to receive a key 19 which connects with a resilient elongated spring shaft 20. This shaft 20 carries a clutch member 21 for gripping pieces of lead which are selected, as hereinafter described, and projected forward into the point of the pencil to writing position.

The clutch 21 comprises a pair of resilient jaw members $21^a$ and 22, see Fig. 7. These jaw members are flared outwardly at their ends and progress to a semi-circular section portion 23 so that the opposed faces of each jaw presents a circular gripping portion for the lead. Formed with or secured to the outer end of the key 19 is an index ring 24. This index ring is preferably transparent and encircles the barrel 10 adjacent the barrel butt end 12. This butt end 12 is marked with a plurality of spaced numerals around its periphery to indicate the number of each piece of lead 1, 2, 3, 4, 5, 6, 7 or 8 contained in the lead magazine 25, see Figs. 1 and 5. Also, this sleeve 24 is formed with a plurality of open ended notches $28^a$ which are positioned opposite each of the said numerals and are adapted to cooperate, as hereinafter explained, with an index pointer 26 carried by a turnable cap 27, which fits over the open butt end 12 of the barrel 10.

Extending from the center of the cap 27 is a shaft 28. The cap end of the shaft is keyed in the said cap by a square end $27^a$ so as to be rotatable therewith and the cap is formed with knurled portions 29 around its outer periphery to facilitate the turning thereof, see Fig. 2. The cap 27 can turn only when the sleev 24 is uppermost on the barrel 10 and clutch 21 is entirely free of magazine 25, as hereinafter explained. The end of the shaft 28 that is opposite to the cap extends through a central bore formed in the lead magazine 25 and is welded or keyed therein so that the magazine is rotatable by motion imparted thereto from the turning of the cap 27. The cap 27 is normally locked against rotation by a pin $30^b$ formed on the end of a spring $30^a$ secured to the interior wall of the barrel 10 by rivets $23^c$ adjacent the butt end 12. The sleeve 24 controls the locking and unlocking of the cap 27 by cam action with the head of a lug $30^d$ relatively shorter than the lock pin $30^b$. This lug $30^d$ projects from the spring $30^a$ between the rivets and the pin $30^b$, so that when the sleeve 24 is pulled upward along the barrel 10 into a position over the index numerals, it engages lug $30^d$ and forces the spring $30^a$ inward and retracts the lock pin $30^b$ from one of a plurality of openings or depressions in the interior surface of an annular skirt $30^e$ around the cap 27. These depressions are adapted to line up with the lead channels in magazine 25. When the cap 27 is thus unlocked and turned the index pointer 26 is adapted to come opposite any one of the numbers formed on the upper end of the barrel 10, which are visible through the transparent index ring 24.

There are a plurality of teeth $28^b$ formed by reason of the notches $28^a$ in sleeve 24, see Fig. 7. These teeth, equal in number to the notches, are each formed with an outwardly facing shoulder $28^c$, which shoulder $28^c$ is engaged by a lug 30 on the underside of the pointer 26 to thereby lock the sleeve 24 in its uppermost position, until the cap 27 is turned to align the pointer 26 with an index numeral on the barrel 10. When this cap 27 is thus turned the dog or lug 30 drops into one of the notches $28^a$ opposite the index number selected and the sleeve 24 becomes unlocked for movement downwardly along the barrel 10.

When the index pointer 26 is thus engaged in one of the notches $28^a$ of the index ring opposite a selected number thus indicates that one of the lead holder channels 31 formed in the lead magazine 25 is positioned opposite the clutch 21 of the lead carrier secured to the index ring 24. Now all that is necessary to pick up and eject a lead from a lead channel to move it into writing position at the point of the pencil is to slide the ring 24 downwardly along the barrel toward the point of the pencil. As the ring 24 is moved forward along the barrel 10 the cap 27 becomes locked and the key 19 connected to shaft 20 travels in the longitudinal slot 18. The clutch 21 with its resilient jaws $21^a$ and 22 grips at 23 over the end of the piece of lead selected to cause the lead to be moved forward from the magazine into the tip 11 of the pencil to a position beyond the tip end of the conical sleeve 14 as required for writing, see Figs. 2 and 7. After the lead has been thus projected to a desired writing position, the conical sleeve 14 is turned to cause the clutch fingers 13 of the barrel tip 11 to grip the lead and hold it firmly. The fingers 13 are best illustrated in Fig. 5 and are shown in gripping position in Fig. 3 and in released position in Fig. 4.

The lead magazine 25 is of novel construction and comprises in addition to the centrally extending opening for receiving the shaft 28 a plurality of radially arranged channels such as 31, above referred to, see Figs. 6 and 9 for example. Each of these channels 31 is formed to conform in shape to the clutch jaws $21^a$ and 22, and have their respective bores fitted with a U-shaped liner, which conforms and fits within each channel in the magazine. These U-shaped channel linings $31^a$, see Fig. 9, may be made to slightly grip the lead so as to provide slight frictional engagement therewith and thus serve to retain the leads in place prior to being picked up by the clutch 21. As the clutch 21 is fed forward to engage the end of a lead it must pass a triangular shaped projection 33, see Fig. 8. These projections 33 serve a dual purpose as will appear and extend toward the axis of the shaft 28 and overlie the top opening of each lead holder channel 31 so that the diverging part of the jaws $21^a$ and 22 are spread apart by this projection as the clutch 21 is fed forward into one of the channels. This provides for the rounded portions 23 of the clutch to freely pass around the upper end of the lead and when the clutch jaws 21a and 22 pass by the projection 33 these clutch jaws 21a and 22, due to their yieldable resilient character, snap closed around the end of the lead. The continued forward movement of the clutch then carries the lead forward into the tip 11 and lead writing position.

As shown in Fig. 8 these projections 33 may be formed from a separate disc 34 fixed within the bore of the barrel 10 just above the upper end of the lead magazine 25 or may be integral with barrel 10, as shown in Figures 1 and 2 so that the openings in the disc each registers with an opening or cylinder in the lead magazine. In addition to serving as means for opening or spreading apart the jaw of the clutch 21 to engage a lead these projections 33 also serve to release the jaws from around the end of the lead and rake out the lead from between the jaws as the lead and clutch are withdrawn from writing position to an inactive position. For example, when it is desired to use another lead all that is necessary is to pull the index sleeve 24 upward along the barrel toward the cap 27 so as to withdraw the lead from the pencil tip 11 and back into its particular lead channel. As this is done the upper end of the lead becomes engaged by the projection 33, which serves to rake out the lead from between the clutch jaws 21a and 22 and also serves to aid in this lead releasing action by again spreading the jaws 21a and 22 apart.

In Fig. 11 there is a slight modification of the magazine 25, that is, the disc 34 is eliminated and the projections 33 thereof are formed from the magazine per se. These projections are numbered 33a and extend into the bore of each lead holder channel 31 just as do the disc projections 33. This arrangement eliminates one part of the pencil and in some instances makes the manufacture more simple.

*Operation*

From the foregoing description, it is believed that the operation of the pencil is reasonably clear. However, briefly describing the operation, the index ring 24 must be in its uppermost position on the pencil barrel 10 to unlock the cap 27 by retracting the lock pin 30b from one of the cap skirt indentations by pushing in the lug 30d on the spring 30a secured to the interior of the barrel adjacent the butt end 12.

When the cap 27 is unlocked it is turned to position the pointer 26 to select one of the leads from 1 to 8 on the upper end of the barrel 10 under the transparent index ring 24. The outwardly facing shoulders 28c around the upper edge of the index ring 24 and the dog or lug 30d on the underside of the pointer 26 prevent the ring 24 from being moved downward along the barrel, unless the dog 30d is turned off of a shoulder into one of the eight notches of the ring 24 to a selected lead position. It is, of course, to be remembered that turning of the cap 27 rotates the lead magazine 25 to thereby line up a selected lead channel with the lead carrier clutch 21 keyed to the index ring 24.

The index sleeve 24 is now pushed toward the point 11 along the barrel 10 and the connecting key 19 in the barrel slot connected to shaft 20 of the lead carrier imparts movement to clutch 21 and causes the clutch jaws 21a and 22 to be spread apart by projections 33 at the mouth of the channel for subsequent snapped on engagement with the end of the lead selected. It is, of course, understood that turning of the cap 27 has previously turned the selected lead holding channel 31 of the lead magazine 25 into alignment with the clutch 21 of the non-rotatable lead carrier or plunger.

The shaft 20 of the lead plunger is flexible and resilient to permit it to be deflected by the conical bore of the tip 11 and thus direct the lead through the clutch fingers 13 and out the open restricted end of the conical clutch sleeve 14.

When the cap 27 is thus turned and the dog 30d drops in one of the notches 1 to 8 the sleeve 24 becomes disengaged with one of the shoulders 28c. This unlocks the sleeve 24 for movement downwardly along the barrel. Continued forward movement causes the lead to be projected from the tip of the barrel between the clutch fingers 13 and by a slight twist or turn of the conical sleeve 14 the lead is gripped by the fingers to hold it in projected writing position.

Thus, there is provided an automatic magazine pencil accurately calibrated for sequential selection and projection of a particular lead from any one of a plurality of lead holding channels in such a way as to make it practically impossible for a user of the pencil to operate the same except in the proper sequence. For example, the carrier must be in its uppermost inactive position before the selector mechanism is released; and until the selection is made the lead carrier is prevented from being moved to pick up and project a selected lead to writing position.

Also, the action of the lead clutch is entirely automatic as it is opened and closed by specially positioned projections in the mouth of each lead channel.

Although only two embodiments of the invention have been illustrated and described in detail, it is to be expressly understood that the same is not limited thereto. Various changes may be made in the design and arrangement of the parts illustrated, as will now be apparent to those skilled in the art. For a definition of the invention, reference should be had primarily to the appended claims.

I claim:

1. A magazine pencil comprising a barrel having a conical tip formed with a plurality of flexible fingers for clutching lead projected to writing position and an open butt end, said barrel having an elongated slot extending from said butt end, a conical sleeve turnably mounted on the barrel tip for actuating said clutch fingers to lead engaging and disengaging positions, a turnable cap mounted over the said open butt end, a lead magazine turning shaft centrally extending from the inner side of the cap into the barrel, a lead magazine fixed to the end of the shaft opposite said cap having a plurality of radially arranged lead housing channels, whereby turning of the cap imparts rotation from the shaft to the magazine, a lead carrier reciprocally mounted in the barrel adjacent said shaft, an index ring mounted around the butt end of the barrel connected to the said lead carrier, an index pointer carried by said cap adapted to overlie said index ring, a plurality of notches formed in the rim of the said index ring adjacent the underside of the said cap, each notch being opposite a number indicative of a lead channel and spaced apart radially in registry with the position of each of said lead channels, a key connecting said index ring to said lead carrier, said key projecting through the elongated slot formed in the barrel from the inner bore of the ring outside the barrel to the lead carrier inside the barrel, and a dog carried by the underside of said index pointer on the cap adapted to engage in any one of the said notches in the index ring when selected, thereby positioning a selected lead holding channel opposite the lead carrier prior to each forward movement of the said reciprocable lead carrier to a lead clutching and projected writing position.

2. A magazine pencil comprising a barrel having a conical tip formed with a plurality of flexible fingers for clutching lead projected to writing position and an open butt end, said barrel having an elongated slot extending from said butt end, a conical sleeve turnably mounted on said barrel tip for actuating said clutch fingers to lead engaging and disengaging positions, a turnable cap mounted over the said open butt end, a lead magazine turning shaft centrally extending from the inner side of the cap into the barrel, a lead magazine fixed to the end of the shaft opposite said cap having a plurality of radially arranged lead housing channels, whereby turning of the cap imparts rotation from the shaft to the magazine, a lead carrier reciprocably mounted in the barrel adjacent said shaft, an index ring mounted around the butt end of the barrel connected to the said lead carrier, an index pointer carried by said cap adapted to overlie said index ring, a plurality of notches formed in the rim of the said index ring adjacent the underside of the said cap, each notch being opposite and indicative of a lead channel number and spaced apart radially to register with the position of each of said lead channels, a key slidable along said slot connecting said index ring to said lead carrier, said key projecting from the inner surface of the ring outside the barrel through the slot to the lead carrier inside the barrel, a dog carried by the underside of said index pointer on the cap adapted to engage in one of the said notches in the index ring, to thereby position the lead carrier opposite a selected lead holding channel prior to each forward movement of the said reciprocable lead carrier to a lead projected writing position, a series of blisters formed around the outer surface of said conical barrel tip at the base of each finger and a cooperating depression formed in the inner bore of said tip enclosing conical sleeve for compressing the fingers into lead engagement.

3. A magazine pencil comprising a barrel having a tip formed with a plurality of flexible fingers for clutching lead projected to writing position and an open butt end, said barrel having an elongated slot extending from said butt end, a conical sleeve turnably mounted and longitudinally movable over said barrel tip for actuating said clutch fingers to lead engaging and disengaging positions, a turnable cap mounted over the said open butt end, a lead magazine turning shaft centrally extending from the inner side of the cap into the barrel, a lead magazine fixed to the end of the shaft opposite said cap having a plurality of radially arranged lead housing channels, whereby turning of the cap imparts rotation from the shaft to the magazine, a lead carrier reciprocably mounted in the barrel adjacent said shaft, lead release means fixed within the barrel above said magazine for disengaging a selected lead from said lead carrier upon retraction of the said carrier, an index ring mounted around the butt end of the barrel connected to the said lead carrier, an index pointer carried by said cap adapted to overlie said index ring, a plurality of notches formed in the rim of the said index ring adjacent the underside of the said cap, each notch being positioned opposite a number and spaced apart radially to register with the position of each of said lead channels, a key connecting said index ring to said lead carrier, said key projecting through the slot in the barrel from the inner bore of the ring outside the barrel to the lead carrier inside the barrel, and a dog carried by the underside of said index pointer on the cap adapted to engage in one of the said notches in the index ring, to thereby position the lead carrier opposite a selected lead holding channel prior to each forward movement of the said reciprocable lead carrier to a lead projected writing position.

4. A magazine pencil comprising a barrel having a conical tip formed with a plurality of flexible fingers for clutching lead projected to writing position and an open butt end, said barrel having an elongated slot from said butt end, a conical sleeve turnably mounted and longitudinally movable over said barrel tip for actuating said clutch fingers to lead engaging and disengaging positions, a turnable cap mounted over the said open butt end, a lead magazine turning shaft centrally extending from the inner side of the cap into the barrel, a lead magazine fixed to the end of the shaft opposite said cap having a plurality of radially arranged lead housing channels, whereby turning of the cap imparts rotation from the shaft to the magazine, a lead carrier reciprocably mounted in the barrel adjacent said shaft, said lead carrier comprising resiliently yieldable lead grippers, a plurality of lead release projections positioned in the path of said reciprocable lead carrier adapted to disengage the said lead grippers from engagement with a selected lead, an index ring mounted around the butt end of the barrel connected to the said lead carrier, an index pointer carried by said cap adapted to overlie said index ring, a plurality of notches formed in the rim of the said index ring adjacent the underside of the said cap, each notch being numbered and spaced apart radially to register with the position of each of said lead channels, a key slidable in said barrel slot connecting said index ring to said lead carrier, said key projecting from the inner surface of the ring outside the barrel to the lead carrier inside the barrel, and a dog carried by the underside of said index pointer on the cap adapted to engage in one of the said notches in the index ring, to thereby position the lead carrier opposite a selected lead holding channel prior to each forward movement of the said reciprocable lead carrier to a lead projected writing position.

5. In a magazine pencil having a hollow barrel a rotatable lead holder magazine with a plurality of radially positioned longitudinal lead holding channels inside the barrel at each end, index means for indicating the position of each channel, said means comprising a reciprocating nonrotatable ring for imparting reciprocation to said carrier and a rotatable pointer overlapping the same, a reciprocable lead carrier fixed to said ring of said index means, a cap for imparting a selected rotation of the said overlapping pointer and the magazine, to thereby align a selected one of the channels of the magazine with the lead carrier, said lead carrier comprising a shaft operatively connected to said index means, a clutch mounted on the free end of said shaft, said clutch having yieldably resilient jaws, each of said jaws having a lead gripping portion and flaring ends, and means formed adjacent the upper end of the said lead magazine adapted to engage between the said flaring ends of said jaws during a portion of the reciprocation of the said lead carrier to spread apart said jaws.

6. In a magazine lead pencil having a hollow barrel, a lead holding magazine having a plurality of radially positioned lead-holding channels, a lead retaining liner in each channel of the magazine, a forwardly movable and retractable lead carrier including resilient clutch jaws, and a disc fixed in the barrel having a plurality of radially positioned openings corresponding in number to the said lead channels and alignable therewith, said disc having a lead releasing projection in each opening, each of said lead releasing projections overhanging each channel bore to release the lead from between a lead carrier clutch jaw when the said carrier is retracted.

7. In a magazine pencil having a hollow barrel open at the top, a rotatable lead holder inside the barrel with a plurality of radially positioned longitudinal lead holding channels open at each end, liner means in each channel for normally retaining said leads therein, index means for indicating the position of each channel, said means comprising a reciprocating non-rotatable circumferentially marked ring surrounding the barrel and a pointer overlapping the same, a reciprocable lead carrier fixed to said ring of said index means for imparting reciprocation to the carrier, a cap rotatably mounted over the top of the barrel, said pointer being carried by the cap, and a shaft rigidly connected to the center underside of the cap and to the center of the said lead holder for imparting a selected rotation of the cap to the lead holder and the pointer with respect to a mark on said ring to thereby position a selected lead channel by rotating the lead holder into alignment with said lead carrier.

SAMUEL B. HARRIS.

REFERENCES CITED

The following references are of record in the file of this patent:

UNITED STATES PATENTS

| Number | Name | Date |
|---|---|---|
| 1,516,392 | Mabee | Nov. 18, 1924 |
| 1,964,154 | Hertz | June 26, 1934 |